Patented Oct. 24, 1950

2,526,897

UNITED STATES PATENT OFFICE 2,526,897

PRODUCTION OF ARYL INDANS

Vladimir N. Ipatieff and Herman Pines, Chicago, Ill., assignors to Universal Oil Products Company, Chicago, Ill., a corporation of Delaware No Drawing. Application November 28, 1947, Serial No. 788,644

19 Claims. (Cl. 260—668)

This application is a continuation-in-part of our co-pending application Serial Number 619,430 filed September 29, 1945, now abandoned.

This invention relates to a process for producing aryl indan hydrocarbons and particularly for producing phenyl indan hydrocarbons and alkylated or cycloalkylated phenyl indan hydrocarbons.

An object of this invention is the production of an aryl indan hydrocarbon.

Another object of this invention is the production of an alkylated aryl indan hydrocarbon.

A further object of this invention is the production of an alkylated phenyl indan.

One specific embodiment of this invention relates to a process for producing an indan hydrocarbon which comprises reacting at hydrogen transfer conditions in the presence of an acid-acting catalyst a branched-chain olefin and a para-disubstituted benzene hydrocarbon having as one substituent a hydrocarbon group containing only one hydrogen atom joined to the carbon atom combined with the benzene ring.

Another embodiment of this invention relates to a process for producing an indan hydrocarbon which comprises reacting in the presence of an acid-acting catalyst an alkyl cyclohexene hydrocarbon and a para-disubstituted benzene hydrocarbon having as one substituent a group containing only one hydrogen atom joined to the carbon atom combined with the benzene ring.

A further embodiment of this invention relates to a process for producing aryl indan hydrocarbons which comprises reacting at hydrogen transfer conditions in the presence of an acid-acting catalyst an alkylcyclohexene hydrocarbon and a benzene hydrocarbon of the formula

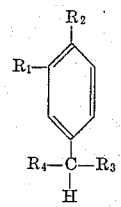

wherein $R_1$ is selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, and a cycloalkyl radical. By the term "cycloalkalkyl" is meant a hydrocarbon radical in which a cycloalkyl group replaces a hydrogen atom of an alkyl group. A cycloalkalkyl radical is thus a cycloalkyl derivative of an alkyl radical.

We have developed a method for producing indan hydrocarbons by effecting a hydrogen transfer reaction between a branched chain olefinic hydrocarbon and an aromatic hydrocarbon containing at least two and not more than five hydrocarbon substituents with two substituents in para position. One of said para-substituents contains at least three carbon atoms and also has a hydrogen atom combined with the carbon atom that is joined to the aromatic ring. The reaction is illustrated by the following equation wherein $x$ is selected from zero and the small even numbers 2, 4, etc.

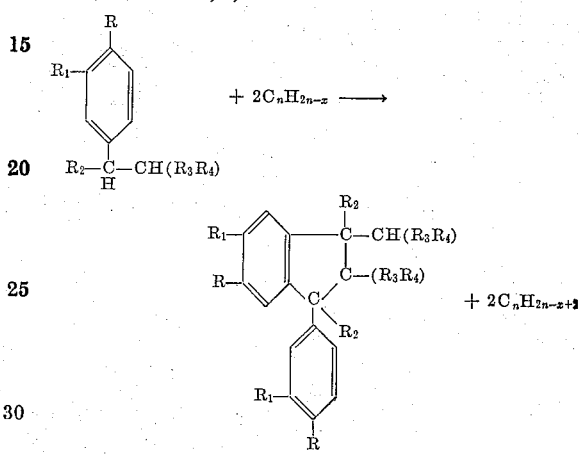

Similarly the production of 1,3,3,6-tetramethyl-1-p-tolylindan from p-cymene and 2-methyl-2-butene is indicated by the equation:

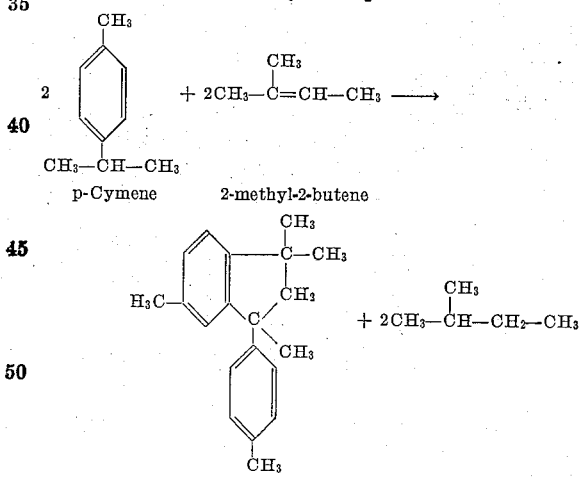

1,3,3,6-tetramethyl-1-p-tolyl indan   iso-pentane

The formation of 1,3,3,6-tetramethyl-1-p-tolylindan by hydrogen transfer between p- cymene and a methylcyclohexene is illustrated by the following equation:

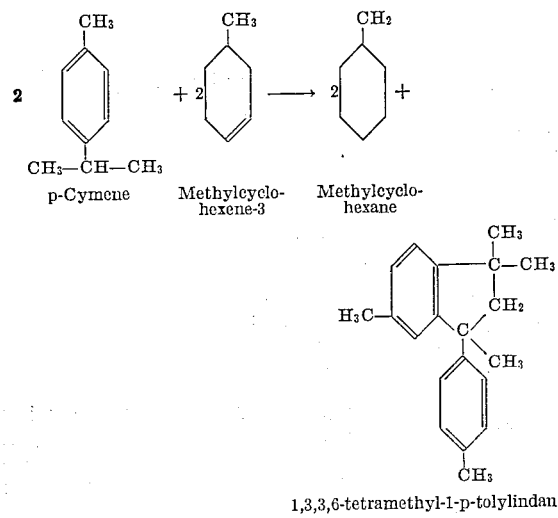

p-Cymene / Methylcyclohexene-3 / Methylcyclohexane 1,3,3,6-tetramethyl-1-p-tolylindan Hydrogen transfer between 2,4-diisopropyltoluene and a branched chain olefin such as methylcyclohexene proceeds according to the equation:

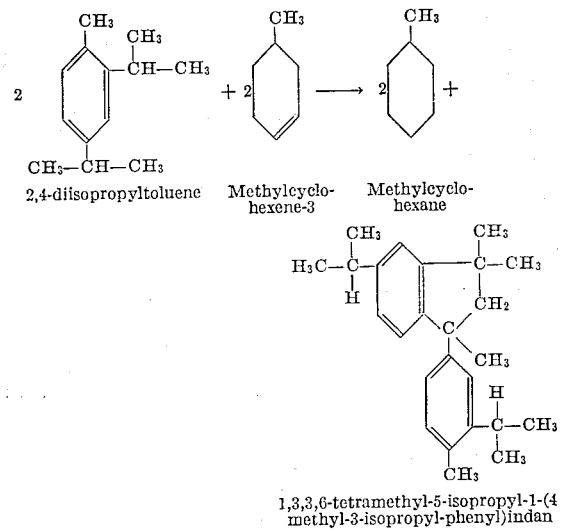

2,4-diisopropyltoluene / Methylcyclohexene-3 / Methylcyclohexane 1,3,3,6-tetramethyl-5-isopropyl-1-(4 methyl-3-isopropyl-phenyl)indan Also hydrogen transfer between 4-isopropyl-2-cyclohexyltoluene and methylcyclohexene takes place to yield the products indicated by the following equation:

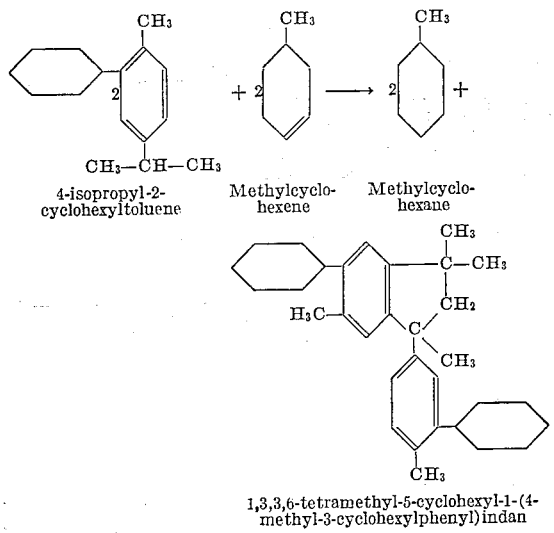

4-isopropyl-2-cyclohexyltoluene / Methylcyclohexene / Methylcyclohexane 1,3,3,6-tetramethyl-5-cyclohexyl-1-(4-methyl-3-cyclohexylphenyl)indan In the cycloalkylated phenylindan hydrocarbons so formed, the cycloalkyl groups may consist of either monocyclic or polycyclic saturated groups having the general formula $C_nH_{2n-1}$, $C_nH_{2n-3}$, etc. The cycloalkyl group may be attached directly to the aromatic nucleus or it may be attached through an alkylene group as $-CH_2-$, $-CH_2-CH_2-$, etc. The cycloalkyl group may also consist of fused rings.

The aromatic compound used in this synthesis of an indan contains at least one para-arrangement of hydrocarbon group substituents in order to take part in this hydrogen transfer reaction. Also one of the substituents in the para-arrangement must have only one hydrogen atom combined with the carbon atom attached to the benzene ring. Accordingly, this hydrocarbon substituent which contains the tertiary hydrogen atom also contains at least three carbon atoms.

Such aromatic hydrocarbons which are useful as starting material for the process have the structures represented by the formula:

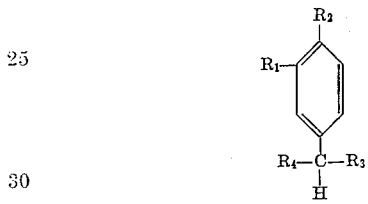

wherein R represents a member selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, a cycloalkyl radical, and a bicycloalkyl radical. The combination of the different R groups should be balanced so as to avoid steric hindrance. Also aromatic hydrocarbons and particularly benzene hydrocarbons containing more than three hydrocarbon substituent groups may also be present in a starting material provided that such a hydrocarbon has a replaceable hydrogen atom combined with a nuclear carbon atom adjacent to the carbon atom which is combined with the group:

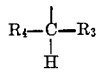

Such aromatic starting materials include p-cymene, 1,2-dimethyl-4-isopropyl benzene, 2,4-diisopropyl toluene, 4-isopropyl-2-cyclohexyl toluene, etc.

Olefinic starting materials suitable for this hydrogen transfer process have branched chains and include such hydrocarbons as trimethylethylene, dihydrolimonene, methyl cyclohexene, 1,1,3-trimethylcyclohexene, menthene, etc. The exact type of olefin to be used is dependent on the catalyst and the aromatic hydrocarbon with which the hydrogen transfer is to be effected. Thus n-octene and cyclohexene, namely, olefins not possessing branched chains, when reacted with a para-dialkyl aromatic at operating conditions similar to those used with the branched chain olefins, effect alkylation but not hydrogen transfer.

In addition to the branched chain monoolefins mentioned above, other olefin-acting compounds which are also utilizable in this process comprise conjugated diolefins containing a tertiary carbon atom, alcohols, ethers, esters of carboxylic acids, and alkyl halides which may be regarded as capable of forming branched chain olefins in situ in the reaction mixture.

The process as herein described is carried out in the presence of an acid-acting catalyst at conditions necessary for the hydrogen transfer reaction. Suitable acid-acting catalysts include mineral acids, such as sulfuric acid, chlorosulfonic acid, fluorosulfonic acid, hydrogen fluoride, hydroxyborofluoric acids, fluorophosphoric acids, phosphoric acids; Friedel-Crafts halide catalysts, particularly aluminum chloride, aluminum bromide, ferric chloride, zirconium chloride, boron fluoride. Since in some cases Friedel-Crafts catalysts may cause an alkyl migration within the aromatic ring before the hydrogen transfer reaction occurs, it is sometimes advantageous to use Friedel-Crafts complexes, such as etherate, alcoholate, etc. for this reaction.

Phosphoric acid catalyst comprise orthophosphoric acid and also polyphosphoric acids such as pyrophosphoric acid, triphosphoric acid, and tetraphosphoric acid. Under certain conditions of operation various acid-acting oxide-type catalysts may be used which include activated clays, silica-alumina composites, and other silica-containing materials which are generally utilizable as catalysts for hydrocarbon cracking.

The operating conditions used in the process are dependent upon the nature of the hydrocarbons being treated and also upon the catalysts employed. When utilizing strong mineral acids, such as hydrogen fluoride, sulfuric acid, fluorosulfonic acid, chlorosulfonic acid, and the like, and also Friedel-Crafts metal halides promoted by a hydrogen halide such as hydrogen chloride, the process is carried out at a temperature of from about −30° to about 100° C., and at a pressure up to about 100 atmospheres. However, in the presence of hydrogen fluoride, sulfuric acid, and aluminum chloride catalysts the preferred operating temperature is generally from about 0° to about 50° C., while in contact with ferric chloride catalyst the preferred operating temperature is from about 50° to about 100° C. Silica-alumina and other synthetic oxide catalysts and clays are generally used at a temperature of from about 200° to about 400° C. and at a superatmospheric pressure generally not in excess of about 100 atmospheres.

Our process is carried out in either batch or continuous type of operation. In batch type operation the usual procedure consists in placing a mineral acid or Friedel-Crafts catalyst and a portion, generally about 50%, of the aromatic hydrocarbon in a reactor provided with a mechanically driven stirrer, cooling these materials to a temperature of from about 0° to about 10° C. and adding thereto with stirring, a solution of the olefin in the remainder of the aromatic hydrocarbon. The reaction mixture is then separated and the product is washed, dried, and distilled to separate therefrom the indan hydrocarbons. Unconverted aromatic hydrocarbons recovered in this distillation are utilizable in the further operation of the process.

The process is also carried out in a continuous manner by passing the aromatic and cycloolefinic hydrocarbons through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor and the aromatic and cycloolefinic hydrocarbons are passed therethrough, the resultant hydrocarbon product requires no washing and drying treatment and may be separated by distillation to separate therefrom unconverted aromatic and cycloolefinic hydrocarbons and to recover the desired indan hydrocarbons.

In order to obtain relatively high yields of indan hydrocarbons by our process, it is necessary to use rather carefully selected hydrocarbon fractions as charging stocks. As already indicated herein, only certain types of aromatic hydrocarbons, namely those containing particular substituents are utilizable as starting materials to produce indan-type hydrocarbons. Thus isopropyltoluene, secondary butyl toluene, para-diisopropylbenzene and others react readily with branched chain olefins to form an indan hydrocarbon and a saturated hydrocarbon, the latter having substantially the same carbon skeleton as that of the olefinic hydrocarbon charged to the process. An aromatic hydrocarbon which does not contain the aforementioned disubstitution in para position does not react with a branched chain olefin to give the desired hydrogen transfer reaction. Also an olefin which does not have a branched chain such as is present in trimethylethylene, dihydrolimonene, methylcyclopentene, etc. acts as an alkylating agent for the aromatic hydrocarbon also charged to the process. Accordingly, in order to obtain hydrogen transfer rather than alkylation it is necessary to use a branched chain olefinic hydrocarbon together with a disubstituted benzene hydrocarbon in which the substituents are in para position and one of said substituents comprises an isopropyl group or other hydrocarbon group in which a tertiary hydrogen is combined with the carbon atom adjacent to the aromatic nucleus.

The indans formed in this process may be sulfonated and hydrolyzed to form phenols or they may be nitrated and reduced to the corresponding amine. The amine may then be diazotized and converted into phenols which may be useful as inhibitors. The sulfonation product of an indan containing a long alkyl, cycloalkalkyl or cycloalkyl group may also be converted into a detergent. Some of the indan hydrocarbons formed in the process are also useful as additives in lubricating oils.

The following examples are given to illustrate the character of results obtained by the use of specific embodiments of the present invention, although the data presented are not introduced with the intention of unduly restricting the generally broad scope of the invention.

*Example I*

33.5 grams (0.25 mole) of para-cymene and 60 grams of sulfuric acid of 96% concentration were placed in a glass reactor provided with a mechanically driven stirrer. The mixture of sulfuric acid and para-cymene was maintained at a temperature of 0° to 10° C. by an ice bath surrounding the reactor and then a mixture of 34 grams (0.25 mole) of menthene and 33.5 grams of para-cymene (0.25 mole) was added to the reactor with stirring during a period of about 1 hour and then the stirring was continued for an additional 0.5 hour. At the end of this time the hydrocarbon layer was separated from the catalyst layer and the former was washed, dried, and distilled. In addition to 47 grams (0.35 mole) of unconverted para-cymene which was recovered, there was obtained 20 grams (0.14 mole) of saturated hydrocarbons comprising essentially menthane and 7.8 grams (0.06 mole) of 1,3,3,6-tetramethyl-1-p-tolylindan.

*Example II*

53.5 grams (0.4 mole) of para-cymene and 67 grams of substantially anhydrous hydrogen fluoride were placed in a copper-lined reactor provided with a mechanically driven copper stirrer and the reaction mixture was cooled to a temperature of 0° to about 10° C. The cooled reaction mixture was then stirred while a mixture of 53.5 grams (0.4 mole) of para-cymene and 55 grams (0.4 mole) of dihydrolimonene was added thereto during a period of 1 hour and the stirring was continued for 0.5 hour. The catalyst layer was then separated from the hydrocarbon layer and the latter was washed, dried, and distilled. 59 grams (0.44 mole) of para-cymene was recovered, thus indicating that 0.36 mole of para-cymene had entered the reaction. The hydrocarbon product contained 40 grams (0.29 mole) of saturated hydrocarbons comprising essentially para-methylisopropylcyclohexane and 41 grams (0.15 mole) of 1,3,3,6-tetramethyl-1-p-tolylindan.

Another run at essentially the same conditions yielded 149 grams of hydrocarbon material which was separated by distillation into the following fractions:

| Fraction Number | Boiling Point | | Refractive Index, $n_D^{20}$ | Weight, Grams |
| --- | --- | --- | --- | --- |
| | °C. | at mm. | | |
| 1 | 164–171 | 760 | 1.4650 | 98 |
| 2 | 171 | 760 | 1.4885 | 4.1 |
| 3 | 40–162 | 5 | | 1.7 |
| 4 | 162–165 | 5 | 1.5478 | 14.3 |
| 5 | 165–168 | 5 | 1.5550 | 26.6 |
| 6 | Above 168 | 5 | | 2.7 |

By ultraviolet absorption analysis, Fraction 1 contained 77% of p-cymene. Accordingly, Fraction 1 was treated at 0° C. with sulfuric acid containing 15% of sulfur trioxide in order to remove p-cymene. After three such treatments, 19 grams of saturated hydrocarbon material was obtained boiling at 160° having a refractive index $n_D^{20}$ of 1.4380 and corresponding to p-menthane, which yielded p-cymene on dehydrogenation in the presence of platinized alumina at 240° C.

Fraction 5 with a boiling point of 328–330° C. at 760 mm. pressure corresponded to 1,3,3,6-tetramethyl-1-p-tolylindan, and by analysis contained 91.31% by weight of carbon and 8.96% of hydrogen. It yielded a tetranitro compound melting at 249° C., the same as that of the tetranitro derivative of synthetically prepared 1,3,3,6-tetramethyl-1-p-tolylindan.

*Example III*

Following the procedure of Example I, 134 grams of para-cymene (1.0 mole), 48 grams of 1-methylcyclohexene (0.5 mole) and 61 grams of sulfuric acid of 96% concentration were contacted in a glass reactor at 0° to 10° C. for 1 hour. From the resultant reaction product there was obtained 88 grams (0.66 mole) of unconverted para-cymene, thus indicating that 0.34 mole of para-cymene had undergone reaction. The reaction mixture also yielded 26 grams (0.27 mole) of saturated hydrocarbons comprising essentially methylcyclohexane and 28 grams (0.11 mole) of 1,3,3,6-tetramethyl-1-p-tolylindan.

A repetition of this reaction between para-cymene and methylcyclohexene in the presence of sulfuric acid yielded 700 grams of hydrocarbon material which was distilled and separated into fractions with properties shown in the following table:

| Fraction Number | Boiling Point | | Refractive Index, $n_D^{20}$ | Weight, Grams |
| --- | --- | --- | --- | --- |
| | °C. | at mm. | | |
| 1 | 101 | 760 | 1.4220 | 114 |
| 2 | 100–172 | 760 | 1.4788 | 9 |
| 3 | 172–174 | 760 | 1.4890 | 378 |
| 4 | 40–101 | 4 | 1.5060 | 6 |
| 5 | 101–124 | 4 | 1.5250 | 8 |
| 6 | 124–126 | 4 | 1.5305 | 23 |
| 7 | 126–138 | 4 | 1.5335 | 8 |
| 8 | 138–156 | 4 | 1.5575 | 5 |
| 9 | 156 | 4 | 1.5580 | 123 |
| 10 | Above 156 | 4 | | 8 |

Investigation of these fractions showed that Fraction 1 consisted of methylcyclohexane, Fraction 3 consisted of unreacted para-cymene, Fraction 6 corresponded to methylcyclohexyl-p-cymene and Fraction 9 corresponded to 1,3,3,6-tetramethyl-1-p-tolylindan, which on nitration yielded 1,3,3,6-tetramethyl-5-nitro-1-(4-methyl-3-nitrophenyl)-indan melting at 112–114° C. and 1,3,3,6-tetramethyl-5,7-dinitro-1-(4-methyl-3,5-dinitrophenyl)-indan, melting at 251–252° C.

*Example IV*

By utilizing the procedure of Example II, 107 grams (0.8 mole) of para-cymene, 38.4 grams of 1-methylcyclohexene (0.4 mole) and 67 grams of liquid hydrogen fluoride were contacted at 0° to 10° C. for 1 hour. The resultant reaction mixture contained 54 grams (0.4 mole) of unconverted para-cymene, thus indicating that 0.4 mole of this hydrocarbon had undergone reaction. The reaction mixture also contained 28 grams (0.28 mole) of saturated hydrocarbons comprising essentially methylcyclohexane and 32 grams (0.12 mole) of 1,3,3,6-tetramethyl-1-p-tolylindan.

Repetition of this run on a larger scale yielded 675 grams of hydrocarbon reaction product which was distilled and separated into fractions shown in the following table:

| Fraction Number | Boiling Point | | Refractive Index, $n_D^{20}$ | Weight, Grams |
| --- | --- | --- | --- | --- |
| | °C. | at mm. | | |
| 1 | 101–102 | 760 | 1.4232 | 160 |
| 2 | 102–173 | 760 | | 1.2 |
| 3 | 173–175 | 760 | 1.4890 | 277 |
| 4 | 50–114 | 5 | | 6 |
| 5 | 114–125 | 3 | 1.5215 | 14 |
| 6 | 125–128 | 3 | 1.5208 | 7 |
| 7 | 128–136 | 3 | 1.5310 | 17 |
| 8 | 136–151 | 3 | 1.5336 | 6 |
| 9 | 151–156 | 3 | 1.5570 | 167 |
| 10 | 155–160 | 3 | 1.5577 | 16 |
| 11 | Above 160 | 3 | | 9.5 |

These various fractions of hydrocarbon material were stable to dilute potassium permanganate solution, thus indicating the absence of olefinic hydrocarbons. Investigation of the various fractions showed that Fraction 1 consisted of methylcyclohexane, Fraction 3 was unreacted p-cymene, Fraction 6 (boiling point 290–293° at 760 mm.) corresponded to methylcyclohexyl-p-cymene, and Fraction 9 (boiling point 318–326° C. at 760 mm.) which melted at 37.5–38° C. corresponded according to the physical constants, ultraviolet absorption analysis, and nitro derivative of 1,3,3,6-tetramethyl-1-p-tolylindan.

*Example V*

By employing the apparatus and procedure of Example I, 64 grams (0.48 mole) of para-cymene and 33.5 grams (0.27 mole) of 1,1,3-trimethylcycylohexene were reacted in the presence of 58 grams of 96% sulfuric acid at 0° to 10° C. The resultant reaction mixture contained 39 grams (0.29 mole) of para-cymene, thus indicating that 0.19 mole of para-cymene had reacted. The reaction mixture also contained 18 grams (0.14 mole) of saturated hydrocarbons comprising essentially 1,1,3-trimethylcyclohexane and 18 grams (0.07 mole) of 1,3,3,6-tetramethyl-1-p-tolylindan.

*Example VI*

Following the procedure of Example II, 87 grams (0.64 mole) of para-cymene and 39.8 grams (0.32 mole) of 1,1,3-trimethylcyclohexene were reacted at 0° to 10° C. in a copper-lined reactor in the presence of 55 grams of substantially anhydrous hydrogen fluoride. The resultant reaction mixture contained 49 grams (0.37 mole) of unconverted para-cymene thus indicating that 0.27 mole of para-cymene reacted. The reaction mixture also contained 31 grams (0.25 mole) of saturated hydrocarbons comprising essentially 1,1,3-trimethylcyclohexane and 30 grams (0.12 mole) of 1,3,3,6-tetramethyl-1-p-tolylindan.

*Example VII*

168 grams of anhydrous hydrogen fluoride and 134 grams of para-cymene were introduced into a copper flask provided with a copper stirrer and dropping funnel, said flask being surrounded by a cooling bath of ice and water. 70 grams of trimethylene and 134 grams of para-cymene were mixed and the mixture was then added slowly with stirring to hydrogen fluoride-para-cymene mixture contained in the copper flask. Usually from 1 to 3 hours were required to complete the action of the trimethylethylene-para-cymene mixture after which the stirring of the reaction mixture was continued for an additional time of 30 minutes, and then the content of the flask was poured into a copper beaker containing ice pre-cooled to about −30° C. The resultant hydrocarbon material was separated, washed with dilute aqueous potassium hydroxide solution, then washed with water, dried over anhydrous calcium chloride and distilled. A total of 308 grams of a hydrocarbon product was charged to such a distillation and separated into the following fractions:

| Fraction Number | Boiling Point, °C. | Refractive Index, $n_D^{20}$ | Weight, Grams |
| --- | --- | --- | --- |
| 1 | 28–30 | 1.3540 | 21.4 |
| 2 | 30–165 | 1.4488 | 7.1 |
| 3 | 165–172 | 1.4770 | 44.0 |
| 4 | 172–173 | 1.4891 | 118 |
| 5 | Above 173 | | 117 |

Fraction 1 was found to be isopentane, Fraction 2 contained low boiling paraffins, Fraction 3 consisted essentially of decane, and Fraction 4 consisted of unconverted para-cymene. 106 grams of the higher boiling material (Fraction 5) were redistilled at subatmospheric pressure. The following fractions were collected:

| Fraction Number | Boiling Point °C. | at mm. | Refractive Index, $n_D^{20}$ | Weight, Grams |
| --- | --- | --- | --- | --- |
| V-1 | 40–70 | 3.5 | 1.4908 | 8.5 |
| V-2 | 70–87 | 3.5 | 1.4940 | 5.0 |
| V-3 | 89–94 | 4.0 | 1.4983 | 10.5 |
| V-4 | 94–96 | 4.0 | 1.5021 | 12.5 |
| V-5 | 90–130 | 3.0 | 1.5050 | 9.0 |
| V-6 | 130–147 | 3.5 | 1.5255 | 11.0 |
| V-7 | 144– | 3.0 | 1.5433 | 4.2 |
| V-8 | 144–146 | 3.0 | 1.5577 | 5.5 |
| V-9 | Above 146 | 3.0 | 1.5520 | 8.0 |

Fraction V-4 corresponded to ampyl-p-cymene. Fraction V-6 consisted of a mixture of diamyl-p-cymene and 1,3,3,6-tetramethyl-1-p-tolylindan. Fractions V-8 and V-9 also consisted of 1,3,3,6-tetramethyl-1-p-tolylindan which yielded a tetranitro derivative melting at 248–249° C.

*Example VIII*

In this reaction between 2,4-diisopropyltoluene and methylcyclohexene in the presence of hydrogen fluoride, the apparatus consisted of a 250 ml. copper flask provided with a stirrer, a dropping funnel and a thermocouple well. Twenty-five grams of hydrogen fluoride and 36 g. (0.2 M) of diisopropyltoluene, B. P. 80–82° C. at 7 mm. were placed in the flask. The mixture was stirred and to it was added, over a period of half an hour, 10 grams (0.1 M) of methylcyclohexene. The latter was prepared by the dehydration of 4-methylcyclohexanol over activated alumina at 350° C. The temperature of the reaction was maintained at 3–10° C.; the contents of the flask was poured over ice pre-cooled to −60° C. The hydrocarbon layer was separated, washed with dilute potassium hydroxide, followed by water wash and dried over calcium chloride. The product did not contain any organic fluorides; it was stable towards a 2% aqueous potassium permanganate solution, indicating the absence of olefinic hydrocarbons. Thirty-eight grams of the product was submitted to a distillation and separated into fractions shown in the following table:

| Fraction Number | Boiling Point °C. | at mm. | Refractive Index, $n_D^{20}$ | Weight, Grams |
| --- | --- | --- | --- | --- |
| 1 | 99–101 | 760 | 1.4241 | 6.2 |
| 2 | 97–104 | 42 | 1.4943 | 15.0 |
| 3 | 104–117 | 43 | 1.4980 | 2.8 |
| 4 | 117–125 | 40 | 1.5028 | 1.1 |
| 5 | 125–147 | 13 | 1.5171 | 1.5 |
| Residue | | | 1.5397 | 14.0 |

Fraction 1 corresponded to methylcyclohexane. On dehydrogenation, it yielded toluene. Fraction 2 was recovered diisopropyltoluene. Fraction 5 was not investigated but according to physical constants it corresponds to a product resulting from the interaction of diisopropyltoluene with methylcyclohexene.

Fraction 7 was rubbed with a small amount of methanol, the methanol was decanted, and the sticky product which remained was crystallized from absolute alcohol to which was added small quantity of acetone. Crystals were obtained, which softened at 75° and melted at 76°. On recrystallization from absolute alcohol, the product melted at 79.5° C. The yield of the crystalline hydrocarbon amounted to 60% of Fraction 7. This hydrocarbon had an analysis corresponding to the formula $C_{26}H_{36}$ and consisted of 1,3,3,6-tetramethyl-5-isopropyl-1-(4-methyl-3-isopropylphenyl)-indan.

Analysis: Calcd. for $C_{26}H_{36}$: C, 89.65; H, 10.35. Found: C, 89.55; H, 10.23.

One gram of the crystalline hydrocarbon was dissolved in 5 ml. of chloroform. The solution was cooled to 0° and to it was added 1.5 ml. of 96% sulfuric acid and 0.5 ml. of 72% nitric acid; the latter was added in three portions. The temperature was then raised to 20°. A crystalline nitroderivative was obtained, melting at 238–240°. After recrystallization from a solution of ethanol and chloroform, it melted at 250°; the melting point was not depressed when mixed with a known sample of 1,3,3,6-tetramethyl-5-nitro-1-(4-methyl-3-nitrophenyl)-indan.

*Example IX*

In this run 4-methyl-2-cyclohexyltoluene and methylcyclohexene were reacted according to the procedure used in Example VIII. The following reactants and catalysts were charged: 4-methyl-2-cyclohexyltoluene (B. P. 97–96°/2 mm.), 43 g. (0.2 M); methylcyclohexene, 10 g. (0.1 M); and hydrogen fluoride, 25 g. The reaction product was distilled and the following fractions were collected.

| Fraction Number | Boiling Point | | Refractive Index, $n_D^{20}$ | Weight, Grams |
| --- | --- | --- | --- | --- |
| | ° C. | at mm. | | |
| 1 | 98–100 | 760 | | 4.8 |
| 2 | 110–117 | 2 | 1.5179 | 29.4 |
| 3 | 117–174 | 2 | 1.5220 | 1.0 |
| 4 | 174–184 | 2 | 1.5330 | 5.0 |
| Residue | | | | 11.2 |

Fraction 1 was completely saturated, corresponds to methylcyclohexane. Fraction 2 corresponds to unreacted cyclohexyl-p-cymene. The residue boiling above 184° C. at 2 mm. was distilled from a Claisen flask, and 7.4 grams of a glass-like product boiling at 270° C. at 4 mm. was obtained which hardened on cooling. The glass-like product when powdered melted at 52–53°. Unsuccessful attempts were made to recrystallize it from various solvents.

Analysis: Calcd. for $C_{32}H_{44}$: C, 89.71; H, 10.29. Found: C, 89.10; H, 10.63.

Nitration of some of this powdered product was carried out in chloroform solution as described above. A solid was obtained melting at 150–153° C. After two crystallizations from ethanol-chloroform solution the melting point of the nitroderivative was 162–163°. This melting point corresponds to that of 1,3,3,6-tetramethyl-5-nitro-1-(4-methyl-3-cyclohexyl-5-nitrophenyl)-indan.

Analysis: Calcd. for $C_{26}H_{33}N_2O_4$: C, 70.39; H, 7.55; N, 6.40. Found: C, 70.68; H, 7.37; N, 6.50.

Also this solid hydrocarbon was nitrated by treatment with a solution consisting of 2 vol. of 96% sulfuric acid and 1 vol. of 72% nitric acid. A tetranitro derivative was obtained melting at 251–252° which was identical with the melting point of 1,3,3,6-tetramethyl-5,7-dinitro-1-(4-methyl-3,5-dinitro-phenyl)-indan.

Analysis: Calcd. for $C_{30}H_{20}N_4O_8$: C, 54.05; H, 4.50; N, 12.61. Found: C, 54.69; H, 4.71; N, 12.31.

Accordingly, the hydrocarbon material of Fraction 5 consisted of 1,3,3,6-tetramethyl-5-cyclohexyl-1-(4-methyl-3-cyclohexylphenyl)-indan.

*Example X*

By using the apparatus and procedure of Example VIII, 132 grams of p-cymene and 66 grams of 2,6-dimethyl-bicyclo(3,2,1)-2-octene were reacted at 0° C. for one hour in the presence of 46 grams of anhydrous hydrogen fluoride. The resultant hydrocarbon mixture was separated from the hydrogen fluoride catalyst and then 185 grams of the former was fractionally distilled. This distillation separated 133 grams of a mixture of 25% 2,6-dimethyl-bicyclo(3,2,1)-2-octane and 75% unconverted p-cymene from higher boiling material found to contain 30 grams of 1,3,3,6-tetramethyl-1-p-tolylindan and 20 grams of bicycloalkylated p-cymene.

We claim as our invention:

1. A process for producing an indan hydrocarbon which comprises reacting at hydrogen transfer conditions in the presence of an acid-acting catalyst a branched-chain olefin-acting compound and a para-disubstituted benzene hydrocarbon having as one substituent a saturated hydrocarbon group containing at least three carbon atoms and only one hydrogen atom joined to the carbon atom combined with the benzene ring.

2. A process for producing an indan hydrocarbon which comprises reacting at hydrogen transfer conditions in the presence of an acid-acting catalyst a branched-chain olefine and a para-disubstituted benzene hydrocarbon having as one substituent a saturated hydrocarbon group containing at least three carbon atoms and only one hydrogen atom joined to the carbon atom combined with the benzene ring.

3. A process for producing an indan hydrocarbon which comprises reacting in the presence of an acid-acting catalyst an alkyl cyclohexene hydrocarbon and a para-disubstituted benzene hydrocarbon having as one substituent a saturated hydrocarbon group containing at least three carbon atoms and only one hydrogen atom joined to the carbon atom combined with the benzene ring.

4. A process for producing an aryl indan hydrocarbon which comprises reacting at hydrogen transfer conditions in the presence of an acid-acting catalyst an alkylcyclohexene hydrocarbon and a benzene hydrocarbon of the formula

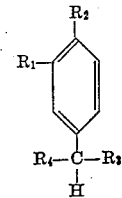

wherein $R_1$ is selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, a cycloalkyl radical, and a bicyclo-alkyl radical.

5. A process for producing an indan hydrocarbon which comprises reacting in the presence of a mineral acid catalyst at a temperature of from about —30° to about 100° C., a branched chain olefin and a para-disubstituted benzene hydrocarbon having as one substituent a saturated hydrocarbon group containing at least three carbon atoms and having a hydrogen atom joined to the carbon atom combined with the benzene ring.

6. A process for producing an indan hydrocarbon which comprises reacting in the presence of a mineral acid catalyst at a temperature of from about −30° to about 100° C. a branched chain alkene and a para-disubstituted benzene hydrocarbon having as one substituent a saturated hydrocarbon group containing at least three carbon atoms and having a hydrogen atom joined to the carbon atom combined with the benzene ring.

7. A process for producing an indan hydrocarbon which comprises reacting in the presence of a mineral acid catalyst at a temperature of from about −30° to about 100° C. an alkyl cyclo-olefin and a para-disubstituted benzene hydrocarbon having as one substituent a saturated hydrocarbon group containing at least three carbon atoms and having a hydrogen atom joined to the carbon atom combined with the benzene ring.

8. A process for producing an indan hydrocarbon which comprises reacting in the presence of a sulfuric acid catalyst at a temperature of from about 0° to about 50° C. a branched-chain olefin and a para-disubstituted benzene hydrocarbon having as one substituent a saturated hydrocarbon group containing at least three carbon atoms and having a hydrogen atom joined to the carbon atom combined with the benzene ring.

9. A process for producing an indan hydrocarbon which comprises reacting in the presence of a hydrogen fluoride catalyst at a temperature of from about 0° to about 50° C. a branched-chain olefin and a para-disubstituted benzene hydrocarbon having as one substituent a saturated hydrocarbon group containing at least three carbon atoms and having a hydrogen atom joined to the carbon atom combined with the benzene ring.

10. A process for producing an indan hydrocarbon which comprises reacting in the presence of a hydrogen fluoride catalyst at a temperature of from about 0° to about 50° C. a branched-chain alkene and a para-disubstituted benzene hydrocarbon having as one substituent a saturated hydrocarbon group containing at least three carbon atoms and having a hydrogen atom joined to the carbon atom combined with the benzene ring.

11. A process for producing an indan hydrocarbon which comprises reacting in the presence of a hydrogen fluoride catalyst at a temperature of from about 0° to about 50° C. an alkyl cyclo-olefin and a para-disubstituted benzene hydrocarbon having as one substituent a saturated hydrocarbon group containing at least three carbon atoms and having a hydrogen atom joined to the carbon atom combined with the benzene ring.

12. A process for producing 1,3,3,6-tetramethyl-1-p-tolylindan which comprises reacting a branched-chain olefin and para-cymene in the presence of an acid-acting catalyst at hydrogen transfer conditions.

13. A process for producing 1,3,3,6-tetramethyl-1-p-tolylindan which comprises reacting a branched-chain olefin and para-cymene in the presence of a mineral acid catalyst at a temperature of from about −30° to about 100° C.

14. A process for producing 1,3,3,6-tetramethyl-1-p-tolylindan which comprises reacting a branched-chain olefin and para-cymene in the presence of a sulfuric acid catalyst at a temperature of from about 0° to about 50° C.

15. A process for producing 1,3,3,6-tetramethyl-1-p-tolylindan which comprises reacting a branched-chain olefin and para-cymene in the presence of a hydrogen fluoride catalyst at a temperature of from about 0° to about 50° C.

16. A process for producing 1,3,3,6-tetramethyl-5-isopropyl-1-(4-methyl-3-isopropylphenyl)-indan which comprises reacting diisopropyltoluene and methylcyclohexene in the presence of a hydrogen fluoride catalyst at a temperature of from about 0° to about 50° C.

17. A process for producing 1,3,3,6-tetramethyl-5-cyclohexyl-1-(4-methyl-3-cyclohexylphenyl)-indan which comprises reacting 4-methyl-2-cyclohexyltoluene and methylcyclohexene in the presence of hydrogen fluoride catalyst at a temperature of from about 0° to about 50° C.

18. An aryl indan having a cycloalkyl group combined with each of two aromatic rings.

19. 1,3,3,6 - tetramethyl - 5 - cyclohexyl-1-(4-methyl-3-cyclohexylphenyl)-indan.

VLADIMIR N. IPATIEFF.
HERMAN PINES.

REFERENCES CITED

The following references are of record in the file of this patent:

UNITED STATES PATENTS

| Number | Name | Date |
|---|---|---|
| 2,328,756 | Thomas | Sept. 7, 1943 |

OTHER REFERENCES

Puranen Chem. Abst., vol. 27, pages 5062-3 (1933), (2 pages).